(12) United States Patent  (10) Patent No.: US 9,501,631 B2
Frye et al.  (45) Date of Patent: Nov. 22, 2016

(54) BIOMETRIC SENSOR FOR TOUCH-ENABLED DEVICE

(71) Applicant: IB Korea Ltd., Gyeonggi-do (KR)

(72) Inventors: Frederick Frye, Simpsonville, SC (US); Dong-Hyuk Jang, Seoul (KR)

(*) Notice: Subject to any disclaimer, the term of this patent is extended or adjusted under 35 U.S.C. 154(b) by 0 days.

(21) Appl. No.: 14/681,648

(22) Filed: Apr. 8, 2015

(65) Prior Publication Data

US 2015/0294099 A1 Oct. 15, 2015

Related U.S. Application Data

(60) Provisional application No. 61/977,958, filed on Apr. 10, 2014.

(51) Int. Cl.
*G06F 3/042* (2006.01)
*G06F 21/32* (2013.01)
*G06F 3/041* (2006.01)
*H04N 1/44* (2006.01)
*G06K 9/00* (2006.01)

(52) U.S. Cl.
CPC ............. *G06F 21/32* (2013.01); *G06F 3/0412* (2013.01); *G06K 9/0004* (2013.01); *H04N 1/442* (2013.01)

(58) Field of Classification Search
CPC ................................ G06F 3/042; G06F 3/0421
USPC .................... 345/175, 173; 340/5.52, 5.53
See application file for complete search history.

(56) References Cited

U.S. PATENT DOCUMENTS

| 5,189,482 A | 2/1993 | Yang |
| 5,650,842 A | 7/1997 | Maase et al. |
| 6,002,786 A | 12/1999 | Hallibert et al. |
| 6,111,977 A | 8/2000 | Scott et al. |
| 6,326,644 B1 | 12/2001 | Lee et al. |
| 6,501,846 B1* | 12/2002 | Dickinson ............... G06F 3/021 345/156 |
| 6,688,186 B2 | 2/2004 | Chae |

(Continued)

FOREIGN PATENT DOCUMENTS

| CN | ZL02146245.3 | 6/2005 |
| CN | 101656299 A | 2/2010 |

(Continued)

OTHER PUBLICATIONS

PCT International Search Report and Written Opinion from International Application No. PCT/US2015/024931, mailed Jun. 22, 2015, 14 pages.

(Continued)

*Primary Examiner* — Kevin Kim
(74) *Attorney, Agent, or Firm* — Brouse McDowell; Heather M. Barnes; Michael G. Craig

(57) ABSTRACT

One or more techniques and/or systems are disclosed for a biometric imager that can be integrated into a touch enabled computing device, and may be used to interact with the device. Upon touching the touch-enabled surface of the device, an image of at least a portion of the touch object can be captured and used in conjunction with identification of the user and/or for input to the device. The systems or techniques, described herein, may be integrated into a portion of the surface of such a device, and may comprise a luminescent layer that can emit photons upon touch, and an image capture component that can generate data indicative of an image of at least a portion of the touch object.

20 Claims, 15 Drawing Sheets

(56) References Cited

U.S. PATENT DOCUMENTS

| | | | |
|---|---|---|---|
| 6,952,490 B2 * | 10/2005 | Lee | H01L 27/12 257/103 |
| 6,993,164 B2 | 1/2006 | Jang | |
| 7,203,344 B2 | 4/2007 | McClurg et al. | |
| 7,248,298 B2 | 7/2007 | Lee | |
| 7,277,562 B2 | 10/2007 | Zyzdryn | |
| 7,929,031 B2 | 4/2011 | Nakayama | |
| 8,224,043 B2 | 7/2012 | Yamada | |
| 8,824,792 B2 | 9/2014 | Frye et al. | |
| 2002/0018252 A1 | 2/2002 | Lee et al. | |
| 2003/0068073 A1 | 4/2003 | Wirtz | |
| 2003/0183019 A1 | 10/2003 | Chae | |
| 2005/0100196 A1 | 5/2005 | Scott et al. | |
| 2006/0159317 A1 | 7/2006 | Shyu et al. | |
| 2006/0269276 A1 | 11/2006 | O'Shea et al. | |
| 2007/0116331 A1 | 5/2007 | Rowe et al. | |
| 2007/0189588 A1 | 8/2007 | Kim et al. | |
| 2008/0055681 A1 | 3/2008 | Li | |
| 2008/0273771 A1 | 11/2008 | Hsieh et al. | |
| 2008/0298650 A1 | 12/2008 | Jang et al. | |
| 2009/0027358 A1 * | 1/2009 | Hosono | G06F 3/0421 345/175 |
| 2009/0259588 A1 | 10/2009 | Lindsay | |
| 2010/0142790 A1 | 6/2010 | Chang | |
| 2011/0253785 A1 | 10/2011 | Johnson | |
| 2012/0014569 A1 | 1/2012 | Frye et al. | |
| 2012/0106808 A1 | 5/2012 | Morioka et al. | |
| 2012/0113160 A1 | 5/2012 | Kurokawa | |
| 2014/0029847 A1 | 1/2014 | Frye et al. | |
| 2014/0099006 A1 | 4/2014 | Frye | |
| 2014/0331875 A1 | 11/2014 | Frye et al. | |
| 2015/0242673 A1 * | 8/2015 | Singhal | G06K 9/00013 345/174 |
| 2016/0004899 A1 * | 1/2016 | Pi | G06F 1/1626 345/173 |
| 2016/0018942 A1 * | 1/2016 | Kang | G06F 3/0488 345/173 |

FOREIGN PATENT DOCUMENTS

| | | |
|---|---|---|
| EP | 1624412 A1 | 2/2006 |
| JP | 3544940 | 4/2004 |
| JP | 2010-049379 A | 3/2010 |
| KR | 10-0285130 | 12/2000 |
| KR | 10-0290954 | 3/2001 |
| KR | 10-0290955 | 3/2001 |
| KR | 10-0302025 | 6/2001 |
| KR | 10-0302026 | 6/2001 |
| KR | 10-0305519 | 7/2001 |
| KR | 10-0309738 | 9/2001 |
| KR | 10-0324130 | 1/2002 |
| KR | 10-0343065 | 6/2002 |
| KR | 10-0345282 | 7/2002 |
| KR | 10-0345283 | 7/2002 |
| KR | 10-0348520 | 7/2002 |
| KR | 10-0349113 | 8/2002 |
| KR | 10-0349415 | 8/2002 |
| KR | 10-0350023 | 8/2002 |
| KR | 10-0378994 | 3/2003 |
| KR | 10-0380836 | 4/2003 |
| KR | 10-0436376 | 6/2004 |
| KR | 10-0439633 | 6/2004 |
| KR | 10-0460825 | 12/2004 |
| KR | 10-0465136 | 12/2004 |
| KR | 10-0466287 | 1/2005 |
| KR | 10-0467279 | 1/2005 |
| KR | 10-0560347 | 3/2006 |
| KR | 10-0879381 | 1/2009 |
| TW | 131132 | 9/2001 |
| TW | I228239 | 2/2005 |
| WO | 93/16441 A1 | 8/1993 |
| WO | 99/12472 A1 | 3/1999 |
| WO | 2005/067608 A2 | 7/2005 |
| WO | 2014018331 A1 | 1/2014 |

OTHER PUBLICATIONS

Fundamentals of Electrostatic Discharge, Part Five—Device Sensitivity and Testing, 2010, ESD Association, Rome, NY, 7 pages.

CIS (Contact Image Sensor), Colortrac, http://www.colortrac.com/glossary/cis-contact-image-sensor/, Apr. 3, 2014, 1 page.

Canaan S. Hong et al., "Single-Chip Camera Modules for Mosaic Image Sensor," Proceedings of Spie, vol. 4306, May 15, 2001, DOI: 10.1117/12.426959.

* cited by examiner

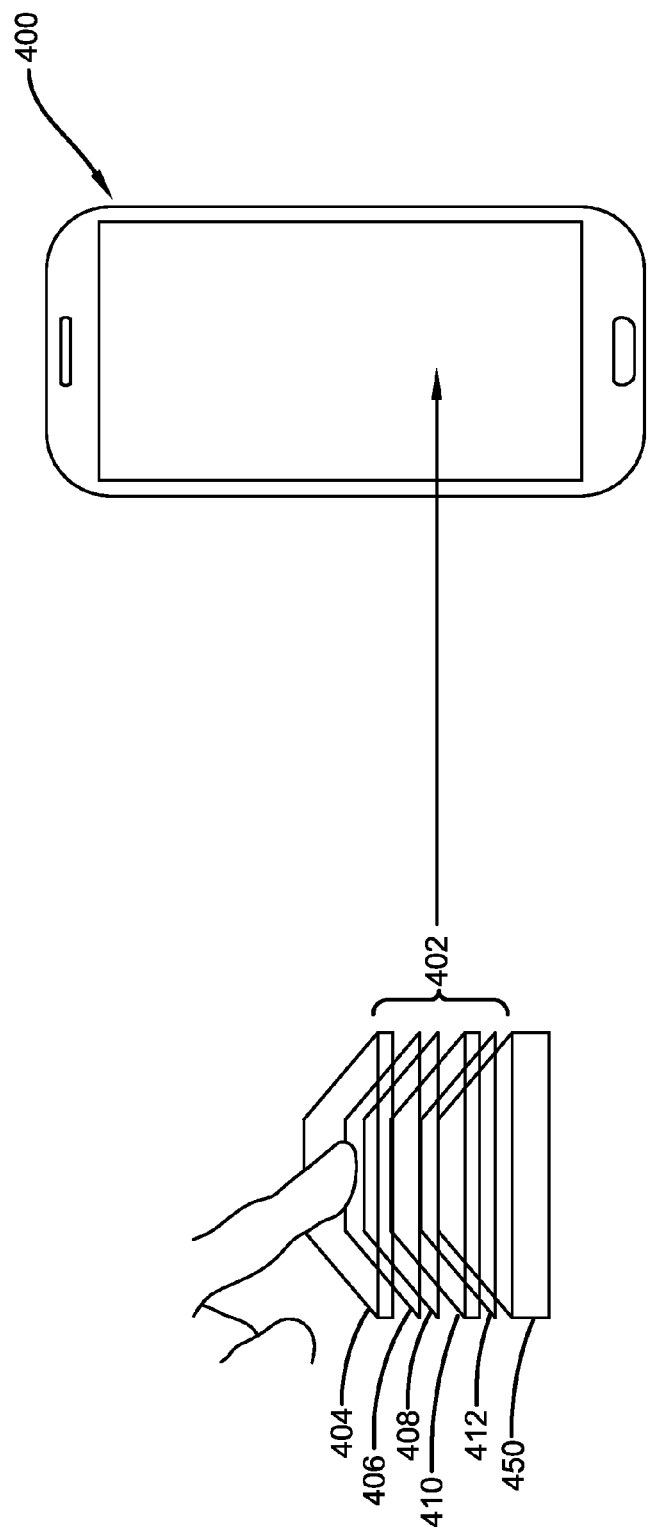

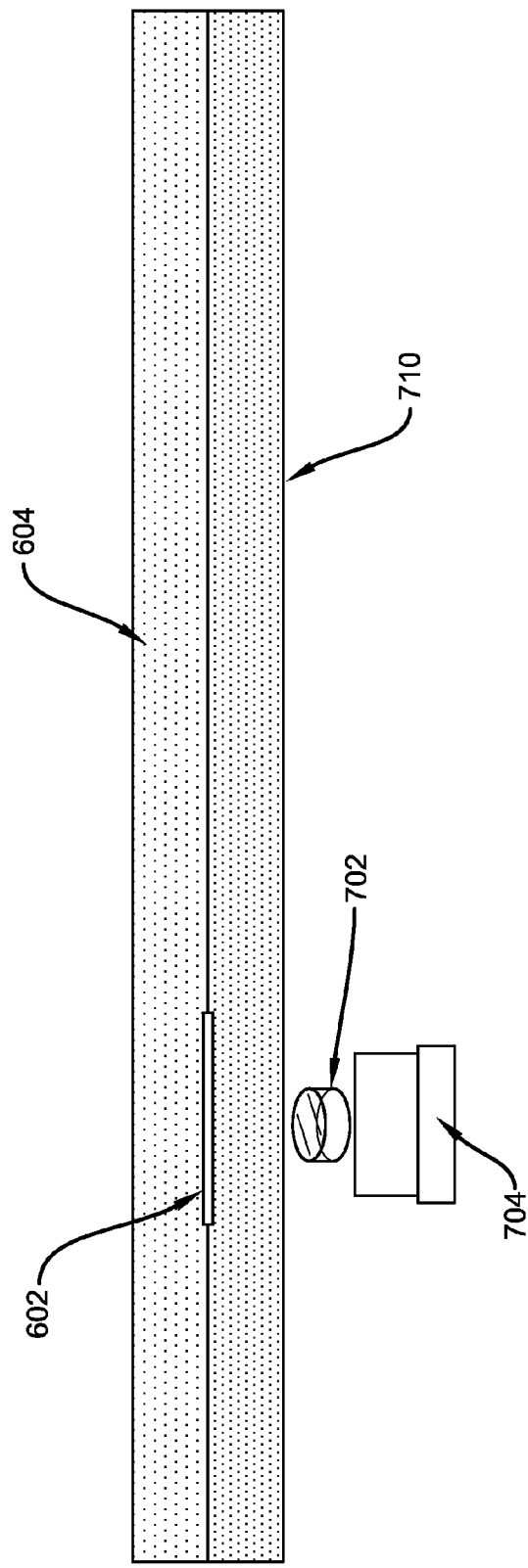

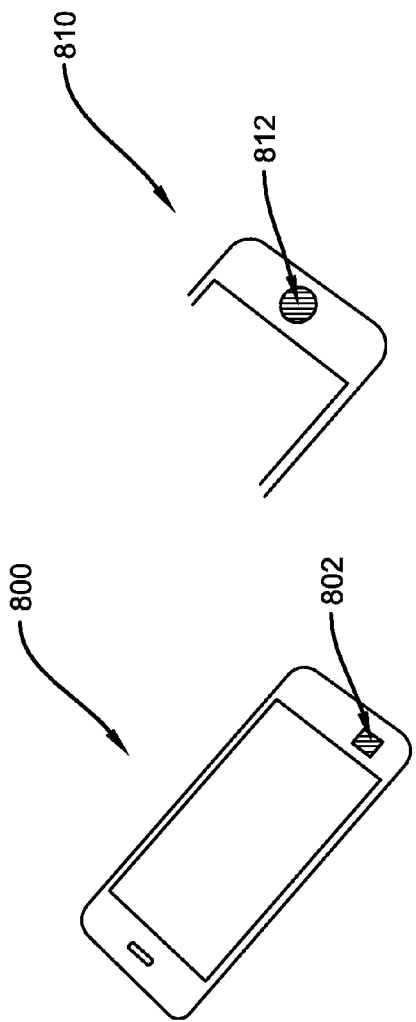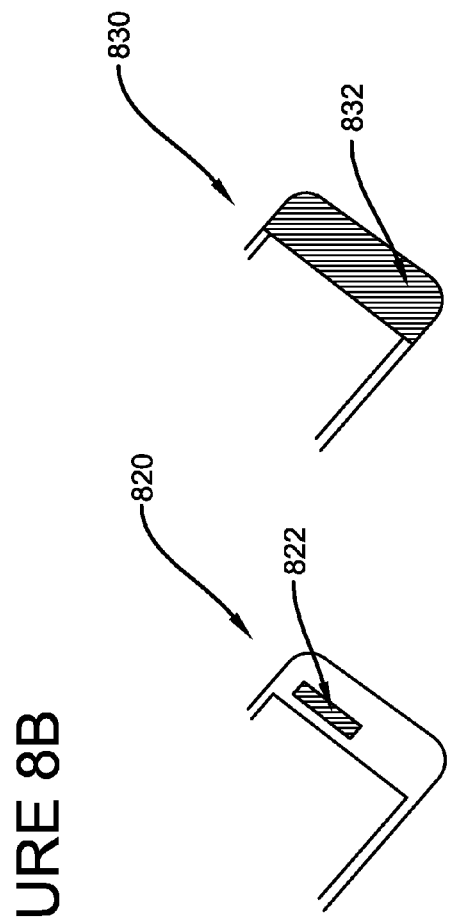

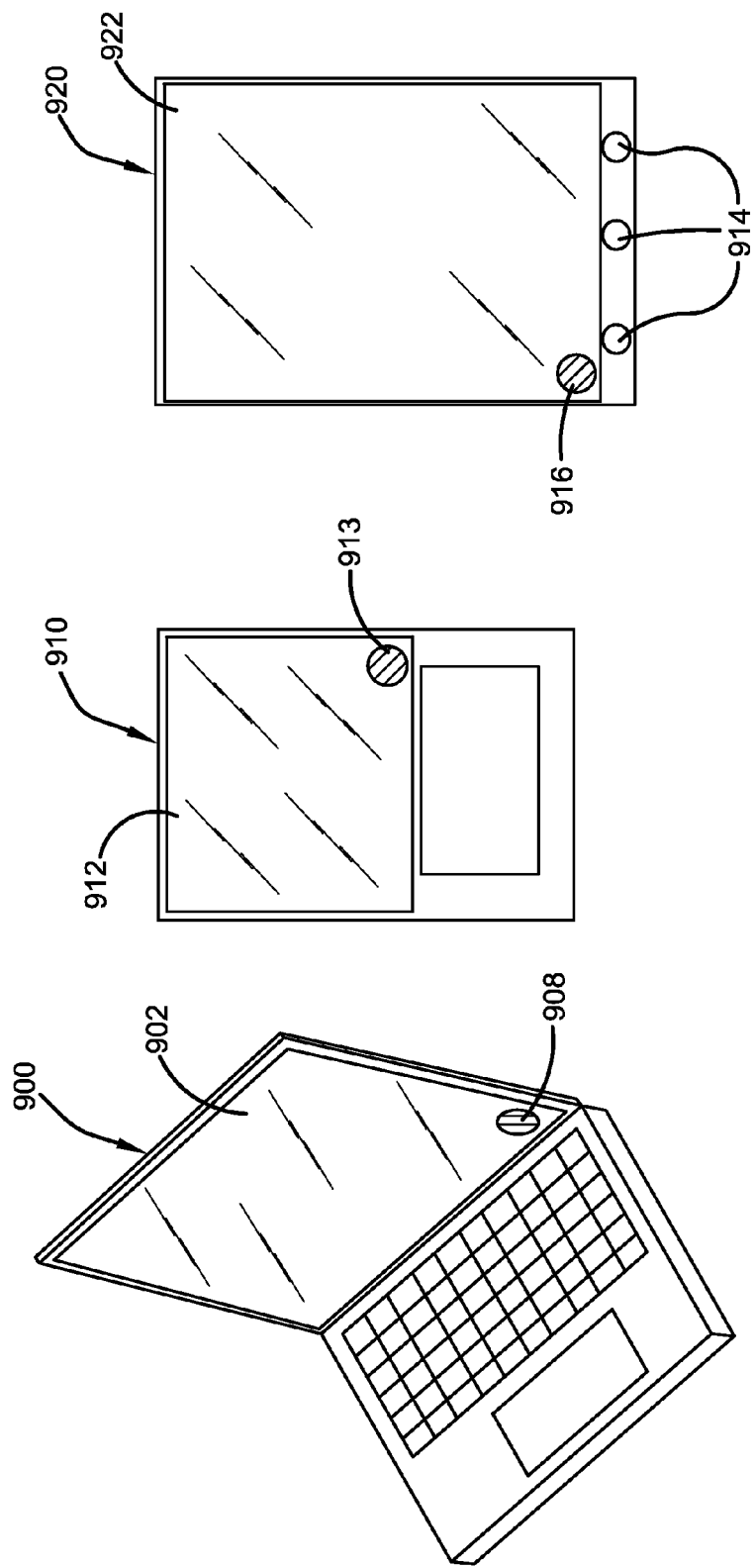

BIOMETRIC SENSOR FOR TOUCH-ENABLED DEVICE

CROSS-REFERENCE TO RELATED APPLICATIONS

This application claims priority to Provisional Patent Application, U.S. Ser. No. 61/977,958, entitled BIOMETRIC SENSOR FOR TOUCH-ENABLED DEVICE, filed Apr. 10, 2014, which is incorporated herein by reference.

BACKGROUND

Biometric scanning devices, such as body-part relief print image capture devices, are commonly utilized in security related implementations and have become readily available to product manufacturers and consumers who may wish to secure information, systems, and the like. Biometric scanning devices typically capture an image of a biometric print using some type of image capture device, where merely the portion of the biometric object in question is represented in a resulting image. As an example, the resulting captured print image can be used for security and/or identification purposes, such as to access a secure system, and/or to identify a person associated with the biometric object.

Touch enabled devices can include portable smart devices, tablet devices, computer monitors, portable computing device displays, smart monitors, televisions, and other displays that may utilize touch as a method of input. As an example, a smartphone (e.g., or other touch enabled display) may comprise a touch enabled screen that is used to interact with screen objects displayed on the device, for input and general device operation functions. As another example, the smartphone (e.g., or other touch enabled device) may also comprise one or more mechanical actuators (e.g., buttons) that can be actuated to enable device functions, such as when the display is not active.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a system or one or more techniques may be devised that provide a biometric imager that can be integrated into a touch enabled computing device, where touch is used to interact with the device. For example, upon touching the touch-enabled surface of the device, an image of at least a portion of the touch object (e.g., biometric object) may be captured. In one aspect, the systems or techniques, described herein, may be integrated into a portion of the surface of such a device, such as the home button area, and may be used for security and/or identification purposes, and/or for input to, or interaction with, the device.

In one implementation, a biometric sensor system can comprise a luminescent layer that is disposed over a portion of a touch screen layer of a touch enabled device. In this implementation, the luminescent layer can be configured to emit photons toward the touch screen layer upon contact from a biometric object. Further, the biometric sensor system can comprise an image capture component that is disposed beneath the luminescent layer at the portion of the touch screen layer. In this implementation, the image capture component can be configured to convert at least a portion of the photons emitted into data that is indicative of an image comprising a representation of at least a portion of the biometric object.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein:

FIG. 4 is a component diagram illustrating an example implementation of one or more portions of one or more systems described herein.

FIGS. 7A and 7B are component diagrams illustrating example implementations of one or more portions of one or more systems described herein.

FIGS. 8A, 8B, 8C and 8D are a component diagrams illustrating an example implementations of one or more portions of one or more systems described herein.

FIGS. 9A, 9B and 9C are component diagrams illustrating example implementations of one or more portions of one or more systems described herein.

DETAILED DESCRIPTION

Figure 1:
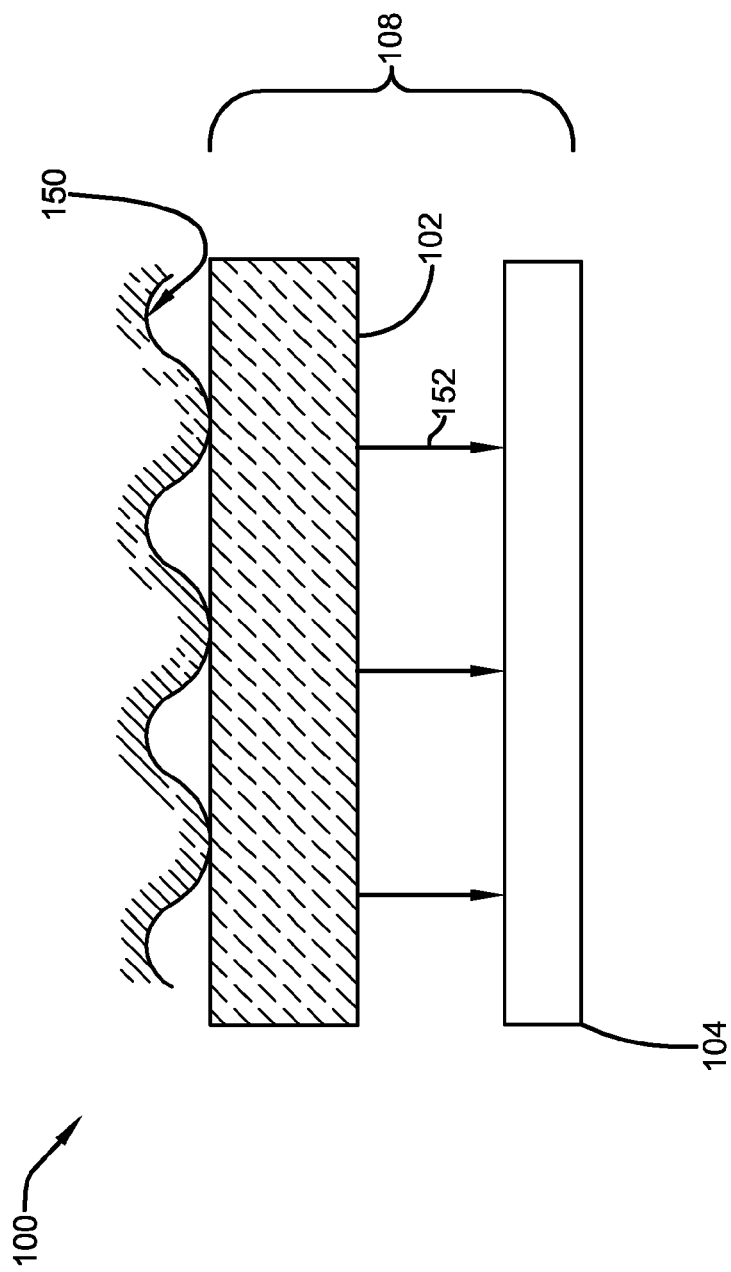
FIG. 1 is a component diagram illustrating an exemplary input device.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices may be shown in block diagram form in order to facilitate describing the claimed subject matter.

As provided herein, a system or one or more techniques may be devised that provide an integrated biometric imager to a touch enabled computing device and/or information appliance, such as a computer, laptop computer, smart device, mobile telephone, tablet device, or some other appliance that can receive input by touching and/or interacting with a touch sensitive surface. As an example, photons emitted from a luminescent layer can be detected by an associated image sensor and converted to corresponding electrical signals. In this example, the electrical signals may be indicative of one or more biometric markers from an applied biometric object (e.g., by finger) to the surface of the touch sensitive surface. Further, the signals may be processed to produce an image representing the one or more biometric markers of the biometric object. In one aspect, the systems or techniques, described herein, may be integrated into the surface of a touch-enabled device and used to associate a user of the device with desired data (e.g., for security purposes, enrollment, or other identification purposes). In another aspect, the signals/data produced by the image sensor component may be used to provide input to the device and/or interact with the device.

FIG. 1 is a component diagram illustrating an exemplary biometric imager device 100. The exemplary biometric imager device 100 can comprise a luminescent layer 102 that is configured to emit one or more photons 152 in a first direction from a portion of the luminescent layer 102 that receives contact from a biometric object 150. As one example, a user may touch the surface of the luminescent layer 102 with their finger 150. In this example, the luminescent layer 102 may emit photons 152 merely at the location of the touch contact.

In one implementation, the luminescent layer 102 may comprise an electroluminescent material that can convert an electrical charge into photons 152. In this implementation, for example, a natural electrical potential difference of a human (e.g., provided by membrane potential) can provide between 10 and 200 volts of electrical charge to the luminescent layer 102. Further, in this implementation, the electrical charge provided to the luminescent layer 102 can be converted into photons 152 by the electroluminescent material disposed in the luminescent layer 102, for example.

In another implementation, the luminescent layer 102 may comprise a piezoluminescent material that can convert pressure applied to the luminescent layer 102 into photons 152. In this implementation, for example, when a force (e.g., provided by a user's finger) applies pressure to the piezoluminescent material, recombination processes involving electrons, holes and ion centers can provide luminescence. Further, in this implementation, for example, the pressure applied to the luminescent layer 102 can be converted into photons 152 from the resulting luminescence provided by the piezoluminescent material disposed in the luminescent layer 102.

Figure 2A:
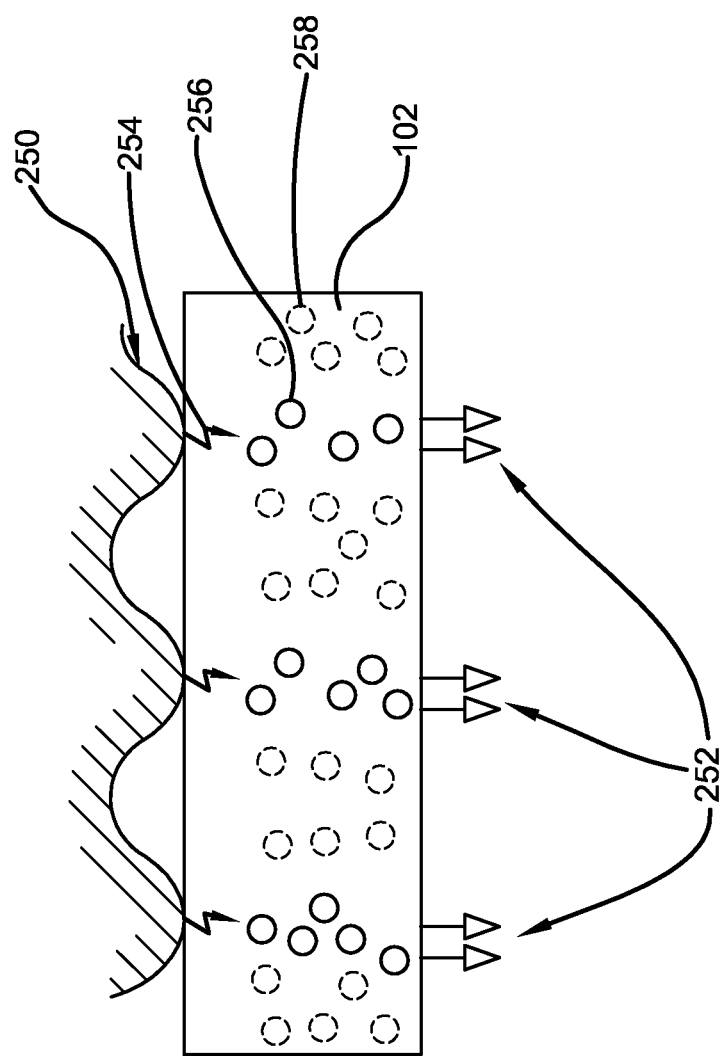
FIGS. 2A and 2B are component diagrams illustrating example implementations of one or more portions of one or more systems described herein.

As an illustrative example, FIG. 2A is a component diagram illustrating an example implementation of one or more portions of one or more systems described herein. In one implementation, the luminescent layer 102 can comprise electroluminescent materials 258 (e.g., fluorescent particles, such as phosphor-based materials, such as phosphor-based inorganic crystal materials with a transitional metal as a dopant or activator, zinc sulfide-based materials, cadmium sulfide-based materials, gallium-based materials, etc.) and a binder material. In one implementation, when a biometric object 250 (e.g., finger or other body part) contacts the luminescent layer 102 and provides the electrical charge 254, the electroluminescent materials 258 may be converted to "activated" particles 256, when subjected to the electrical charge 254, merely at the location of the touch. Further, in this implementation, the "activated" particles 256 may emit photons 252, for example, thereby producing light when subjected to the electrical charge 254.

As an example, the natural electrical potential difference of a human (e.g., provided by membrane potential) can provide between 10 and 200 volts of electrical charge 254 to the contact surface (e.g., top layer) of the luminescent layer 102. Further, in this implementation, when the biometric object 250 contacts the contact surface of the luminescent layer 102, the electrical charge 254 can be provided to the luminescent layer 102. The electrical charge 254 can be converted into photons 252 by activating the luminescent particles 258, thereby becoming "activated" luminescent particles 256 and yielding photons 252, such as toward an image sensing component (e.g., 104).

In another implementation, as illustrated in FIG. 2A, the luminescent layer 102 can comprise piezoluminescent materials 258 (e.g., piezoelectric crystals, such as sodium chloride, potassium bromide, potassium chloride, lithium fluoride, etc.; or certain iron-based polymers). In one implementation, when a biometric object 250 contacts the luminescent layer 102 and applies a pressure force, the piezoluminescent materials 258 may be converted to "activated" materials 256, when subjected to the pressure force 254, merely at the location of the contact and pressure. Further, in this implementation, the "activated" material 256 may emit photons 252, for example, thereby producing light when subjected to the pressure force 254.

As an example, when electroluminescent particles are subjected to an electric charge, spontaneous emission of a photon, due to radiative recombination of electrons and holes, can occur. This process can result when a light source, such as fluorescent molecule in an excited state (e.g., subjected to an electric charge), undergoes a transition to a lower energy state and emits a photon. Further, as another example, when piezoluminescent materials are subjected to pressure, the spontaneous emission of a photon, due to the recombination process of electrons and holes, can also occur. In this example, when these materials are in an excited state (e.g., subjected to pressure), they can undergo the transition to a lower energy state and emit a photon.

Returning to FIG. 1, the exemplary biometric imager device 100 can comprise an image capture component 104. The image capture component 104 can be operably engaged with the luminescent layer 102, such that the image capture component 104 is disposed in a path of the direction of the emitted photons 152. Further, the image capture component 104 may be configured to convert the received photons 152 to an electrical signal. That is, for example, the image capture component 104 may comprise photosensitive material that results in an electrical signal being produced when one or more photons 152 impact the material. In this way, for example, a location and/or number of photons impacting the image capture component 104 may be indicated by a number (e.g., or power) of electrical signals, from an area of the image capture component 104 subjected to the photon 152 impacts. In one implementation, the resulting electrical signals may comprise data indicative of a representation (e.g., image) of the contact area(s) of the biometric object.

In one implementation, the image capture component 104 may comprise an active pixel sensor (APS) or passive pixel sensor (PPS), such as a thin film sensor (e.g., photo-sensitive thin film transistor (TFT), thin film photo-diode) or complementary metal-oxide semiconductor (CMOS). As another example, the sensor arrangement 104 may comprise a charge-coupled device (CCD), a contact image sensor (CIS), or some other light sensor that can convert photons into an electrical signal. Of note, the illustration of FIG. 1 is merely an exemplary implementation of the biometric imager device 100 and is not intended to provide any particular limitations. That is, for example, the gap illustrated between the luminescent layer 102 and the image capture component 104 is exaggerated for purposes of explanation, and may or may not be present in the exemplary biometric imager device 100.

Figure 3A:
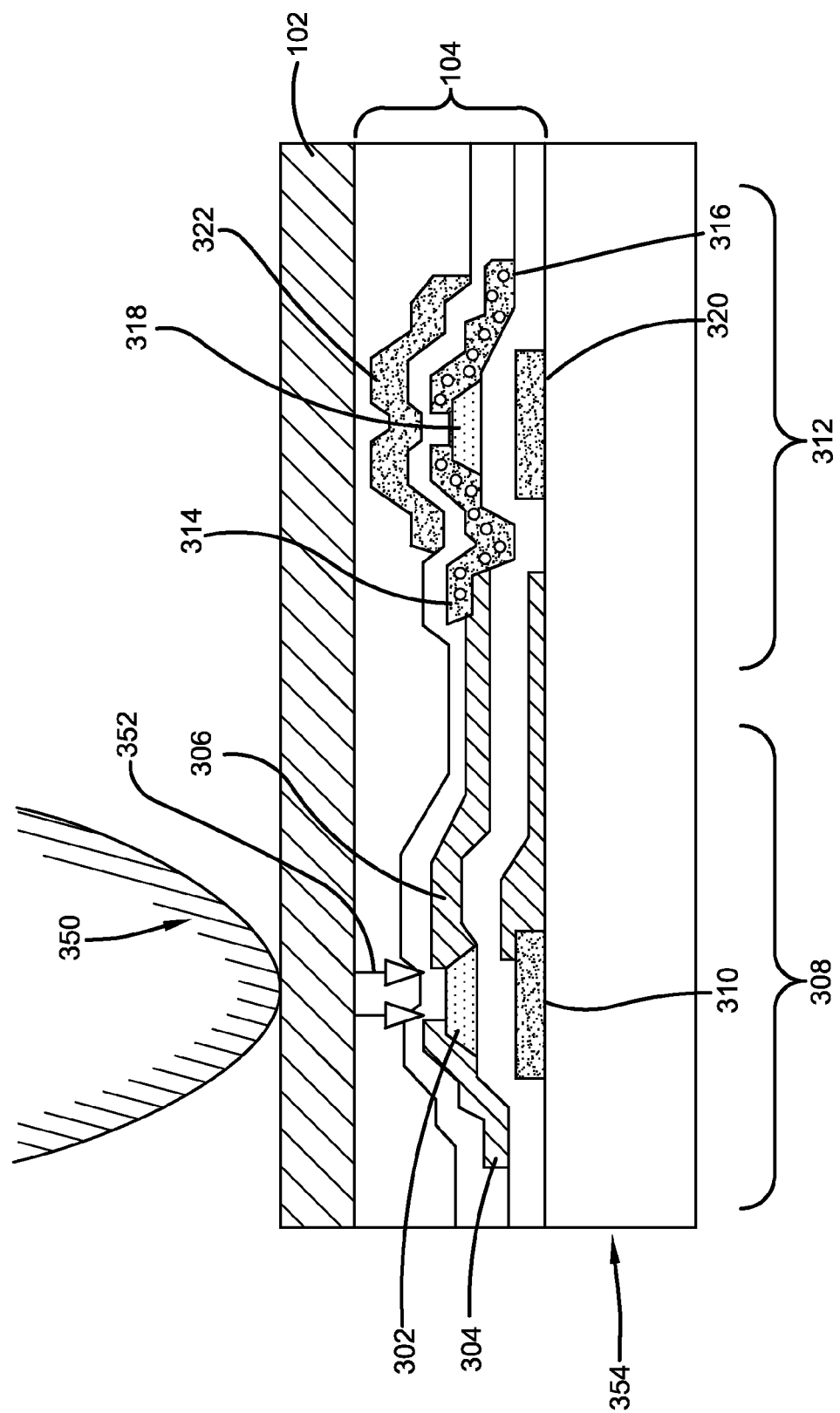
FIGS. 3A and 3B are component diagrams illustrating example implementations of one or more portions of one or more systems described herein.

As an illustrative example, FIG. 3A is a component diagram illustrating an example implementation of one or more portions of one or more systems described herein. In the example implementation of FIG. 3A, the luminescent layer 102 may be disposed over the image capture component 104, which can be used to convert incoming photons 352 into an electronic signal. In one implementation, the image capture component 104 may comprise a thin film sensor array. For example, a thin film sensor-array may be used to detect photons 352 emitted by the luminescent layer 102. Here, as an example, the image capture component 104 can detect photons 352 produced by the luminescent layer 102 (e.g., produced from a biometric object contacting the surface of the luminescent layer 102) and convert the detected photons 352 into an electrical signal.

In this example implementation, a photo-sensitive material 302 (e.g., comprising a semiconductor material, such as SiH, amorphous silicon, germanium-based materials, indium gallium-based materials, lead-based materials) may be formed between a first source electrode 304 and a first drain electrode 306 of a light sensing unit 308. When an electrical charge is applied to a first gate electrode 310, the photo-sensitive layer 302 can become responsive to light, for example, where the photo-sensitive layer 302 may become electrically conductive when incident to photons of light. As one example, when light is incident on the photo-sensitive layer 302 over a predetermined, threshold light amount, the first source electrode 304 and the first drain electrode 306 may become electrically connected. Therefore, in this example, light generated from the luminescent layer 102 (e.g., comprising a fingerprint pattern) may be received by the photo-sensitive layer 302, which may cause an electrical signal to pass from the first source electrode 304 to the first drain electrode 306 (e.g., providing an electronic signal indicative of the light received).

Further, in one implementation, a switching unit 312 of the image capture component 104 can comprise a second source electrode 314, a second drain electrode 316 and an intrinsic semiconductor layer 318. As one example, when a negative charge is applied to a second gate electrode 320, the intrinsic semiconductor layer 318 may become electrically conductive, thereby allowing the electrical signal created at the light sensing unit 308 to pass from the second source electrode to the second drain electrode (e.g., and to an electrical signal reading component for converting to a digital image). In this way, for example, the switching unit 312 may be used to control when an electrical signal indicative of a particular amount of light may be sent to an electrical signal reading component (e.g., for processing purposes, signal location purposes, and/or to mitigate signal interference with neighboring light sensing units).

Additionally, in one implementation, a light shielding layer 322 may be resident over the top portion of the switching unit 312. As one example, the light shielding layer 322 may mitigate intrusion of light to the intrinsic semiconductor layer 318, as light can affect the electrical conductivity of the intrinsic semiconductor layer 318. The image capture component 104 may also comprise a substrate 354 of any suitable material, onto which the layers of the image capture component 104 may be formed. As one example, when a biometric object 350 (e.g., finger, etc.) comes into contact with a contact surface (e.g., top surface, top coating, protective layer) of the luminescent layer 102, an electrical charge (e.g., and/or a pressure force) may pass into the luminescent layer 102. In this example, the luminescent layer 102 may emit photons 352 that are incident to the photo-sensitive layer 302, thereby allowing an electrical signal (e.g., indicative of the number of photons received, and/or location of the received photons) to pass from the first source electrode 304 to the second drain electrode 316.

In one aspect, the exemplary biometric imager device 100 may be used to generate a biometric object relief print. As one example, the exemplary biometric imager device 100 may be used to capture a fingerprint of one or more of a user's fingers (e.g., or other biometric object) placed on the surface of the luminescent layer 102, such as for security purposes, user identification, biometric data logging, biometric data comparison and retrieval, etc. In one implementation, in this aspect, in order to generate an appropriate biometric object relief print (e.g., fingerprint), greater definition of finer details of the biometric object may be needed (e.g., greater than for a touch location detection). In this implementation, a supplemental electrical charge may be used to increase a number of photons produced by the luminescent layer 102, for example, where the increase in photons may provide improved detail definition and improved contrast for finer detail in a resulting image.

Figure 2B:
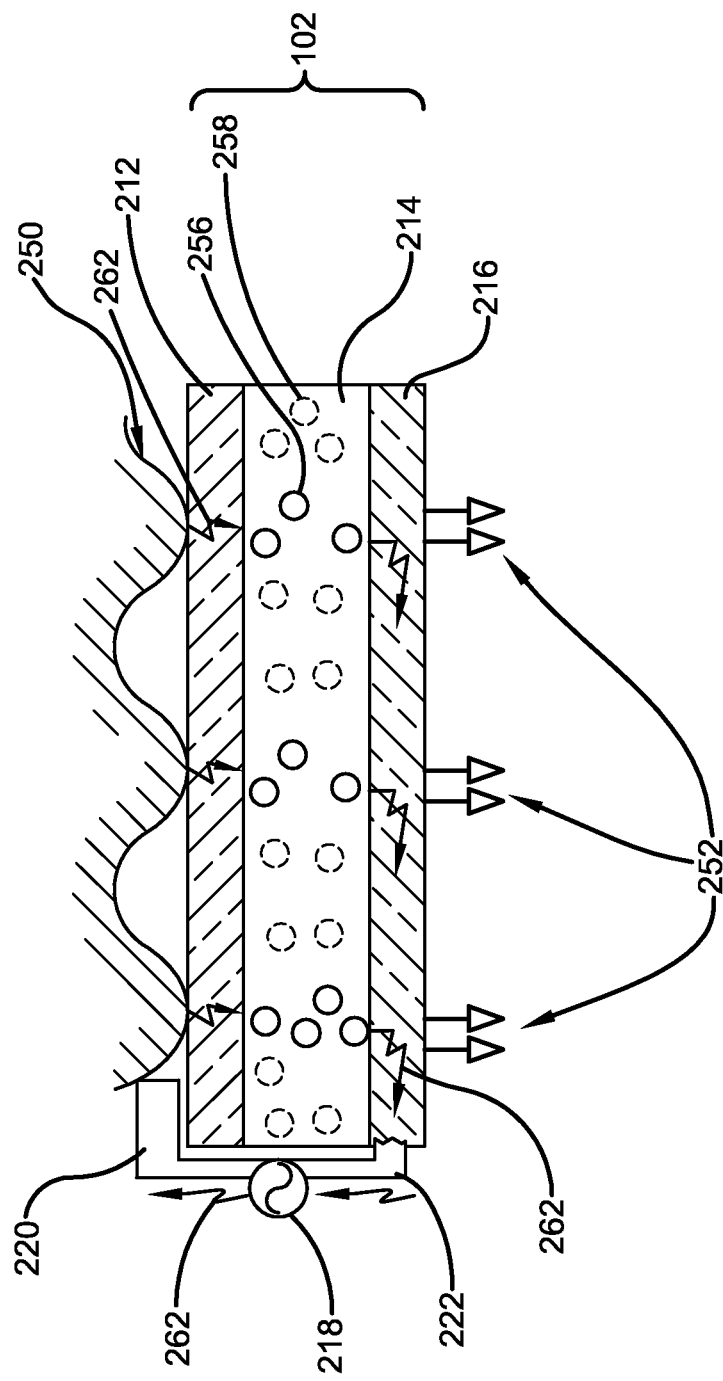

As an illustrative example, FIG. 2B is a component diagram illustrating an example implementation of one or more portions of one or more systems described herein. In the example implementation of FIG. 2B, the luminescent layer 102 may comprise an electrode-based (e.g., single electrode), electroluminescence component. Further, in this implementation, the luminescent layer 102 can comprise an electricity supply 218 (e.g., a power source, such as an AC source), which may provide an electrical connection between the biometric object 250 and the luminescent layer 102. Further, in one implementation, the luminescent layer 102 may comprise a transparent electrode layer 216 (e.g., comprising an indium tin oxide (ITO) material) (e.g., or another optically transparent conductor), an electroluminescent layer 214, and/or a dielectric layer 212 (e.g., a conductive/insulating layer that allows electric potential or an electric field to build across the luminescent layer 102). In this implementation, for example, when the exemplary biometric imager device 100 is activated (e.g., by placing a finger on the surface of the device), photons 252 produced by the luminescent layer 102 can be emitted in the first direction, such as directed toward the image capture component 104.

In FIG. 2B, the luminescent element 102 can comprise the electroluminescent layer 214, for example, comprised of electroluminescent material 258 and a binder material. In one implementation, the electroluminescent material 258 may comprise "activated" particles 256, such as when subjected to an electrical field 262. Further, in this implementation, the "activated" particles 256 may emit photons 252, for example, thereby producing light when subjected to the electrical current 262. Further, in this example implementation, the dielectric layer 212 is resident over the top portion of, and in contact with, the electroluminescent layer 214; and the transparent electrode 216 (e.g., a receiving electrode) is resident under the bottom portion of, and in contact with, the electroluminescent layer 214. Further, the power source 218, such as an alternating current (AC) power source, may be electrically coupled with an electrode connection 222, in electrical connection with the transparent electrode 216, and a contact electrode 220 (e.g., a biometric object contact electrode) residing substantially adjacent to, a contact surface (e.g., top surface) of the dielectric layer 212.

In one implementation, the biometric object 250 may contact both the contact surface of the dielectric layer 212 and the contact electrode 220. In this implementation, for example, upon contacting both the dielectric layer 212 and the object contact electrode 220, an electrical circuit may be created between the contact electrode 220 and the transparent electrode 216, thereby allowing voltage potential 262 to flow between the two electrodes. Further, in this implementation, those portions of the biometric object 250 (e.g., body-part relief ridges) that come in contact with the contact surface of the dielectric material layer 212 can allow a voltage potential across the contact electrode 220 and transparent electrode 216. Additionally, the electric field 262 can "activate" the electroluminescent particles 256 merely at the location of the touch. Upon "activation," the activated particles 256 may emit photons 252 merely at the location of the contact of the portions of the biometric object 250 (e.g., fingerprint ridges). In this way, for example, an illuminated relief print (e.g., fingerprint) of the biometric object 250 (e.g., finger) may be produced when the biometric object 250 contacts both the contact electrode 220 and the contact surface of the dielectric layer 212.

Figure 3B:
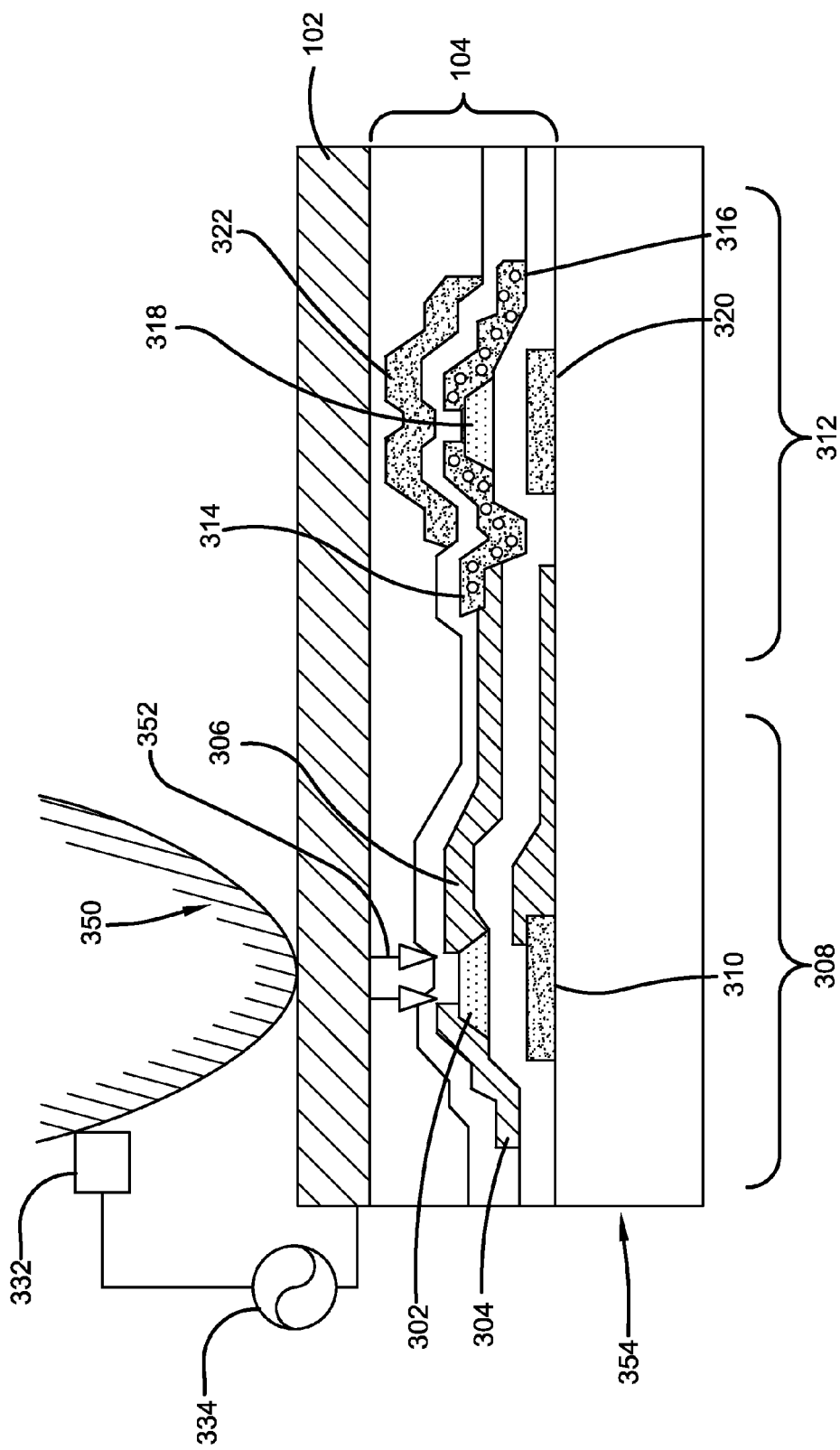

As another illustrative example, FIG. 3B is a component diagram illustrating an example implementation of one or more portions of one or more systems described herein. In this example implementation, the luminescent layer 102 is coupled with the example, image capture component 104, which is disposed on an example, substrate layer 354. Further, in this implementation of a portion of the exemplary device 100, the luminescent layer 102 is electrically coupled with a power source 334, which is electrically coupled with a grounding electrode 332. In this implementation, as an example, when a biometric object (e.g., finger, etc.) comes into contact with the grounding electrode 332 and the luminescent layer 102 (e.g., the dielectric layer 212 of FIG. 2B), an electrical current is passed from the power source 334 to the grounding electrode 332, and into the luminescent layer 102 through the biometric object 350. The resulting photons 352 emitted by the luminescent layer 102 (e.g., by the electroluminescent layer 214 of FIG. 2B) may impact on the photo-sensitive layer 302 of the image capture component 104, resulting in the output of one or more electrical signals, indicative of a relief print of the biometric object 350.

FIG. 4 is a component diagram illustrating an example implementation of one or more portions of one or more systems described herein. In this implementation, a mobile device 400, such as a smartphone or some other portable data device, can comprise a "cover glass" 402, where "cover glass" is merely used as a generic term to indicate the optically clear cover that may be found on portable devices, smartphones, tablets, laptops, monitors, and other computer screens; and is not intended to limit the components of the "cover glass" to those comprising actual glass. That is, "cover glass" may comprise one or more layers of various components including, but not limited to glass, polymers, polyester, films, electrode layers, shielding, ceramics, coatings, polarizing layers, and more. In this implementation, and others, described herein, the term "cover glass" may refer to any or all of these components alone or in combination, and may not include actual glass.

In one implementation, as illustrated in FIG. 4, a top layer of the cover glass 402 may comprise a protective coating 404. A protective coating can be configured to provide protection to the surface of the cover glass, such as from dirt, liquids, ultra-violet light, scratches, and shock, for example. Further, in some implementations, the cover glass 402 may comprise an adhesive layer 406, configured to adhere the protective coating to the top surface of the cover glass 402. In this implementation, the cover glass 402 can comprise a first conducting film 408. As an example, the first conducting film 408 can comprise an optically transparent electrode-type material, formed from inorganic or organic materials. As an example, an inorganic material, such as indium tin oxide (ITO), fluorine doped tin oxide (FTO), and/or doped zinc oxide, may be used to create the first conducting film 408. Alternately, an optically transparent electrode-type material may comprise an organic material, such as graphene, carbon nanotubes, and/or polymers, which may be used to create the first conducting film 408.

As illustrated in FIG. 4, the cover glass 402 may comprise a glass layer 410 (e.g., or polymer or polyester layer), for example, comprising treated and/or toughened glass (e.g., treated with alkali salts, tempered, etc.) made of a variety of materials, such as aluminosilicates and other materials. Further, in some implementations, the cover glass 402 can comprise a second conducting film 412, similar to the first conducting film 408. As an example, the use of two conducting films 408, 412, sandwiching the glass layer 410, may enable the cover glass to be a capacitive touch screen, where a user may merely touch the cover glass to interact with on-screen events and/or to input data.

In the example implementation of FIG. 4, the cover glass 402 may be disposed over a display screen 450, for example, comprising a liquid crystal display (LCD). The display screen 450 may provide the visual output of the user interface (UI) for the device 400, for example, including the on-screen buttons, input widgets, and visual content displayed to the user. In this implementation, the cover glass 402 may comprise a touch-enabled screen and protective cover for the display screen 450, protecting the display screen 450 from liquids, dirt and physical damage, while providing a primary input tool for the device 400.

Figure 5:
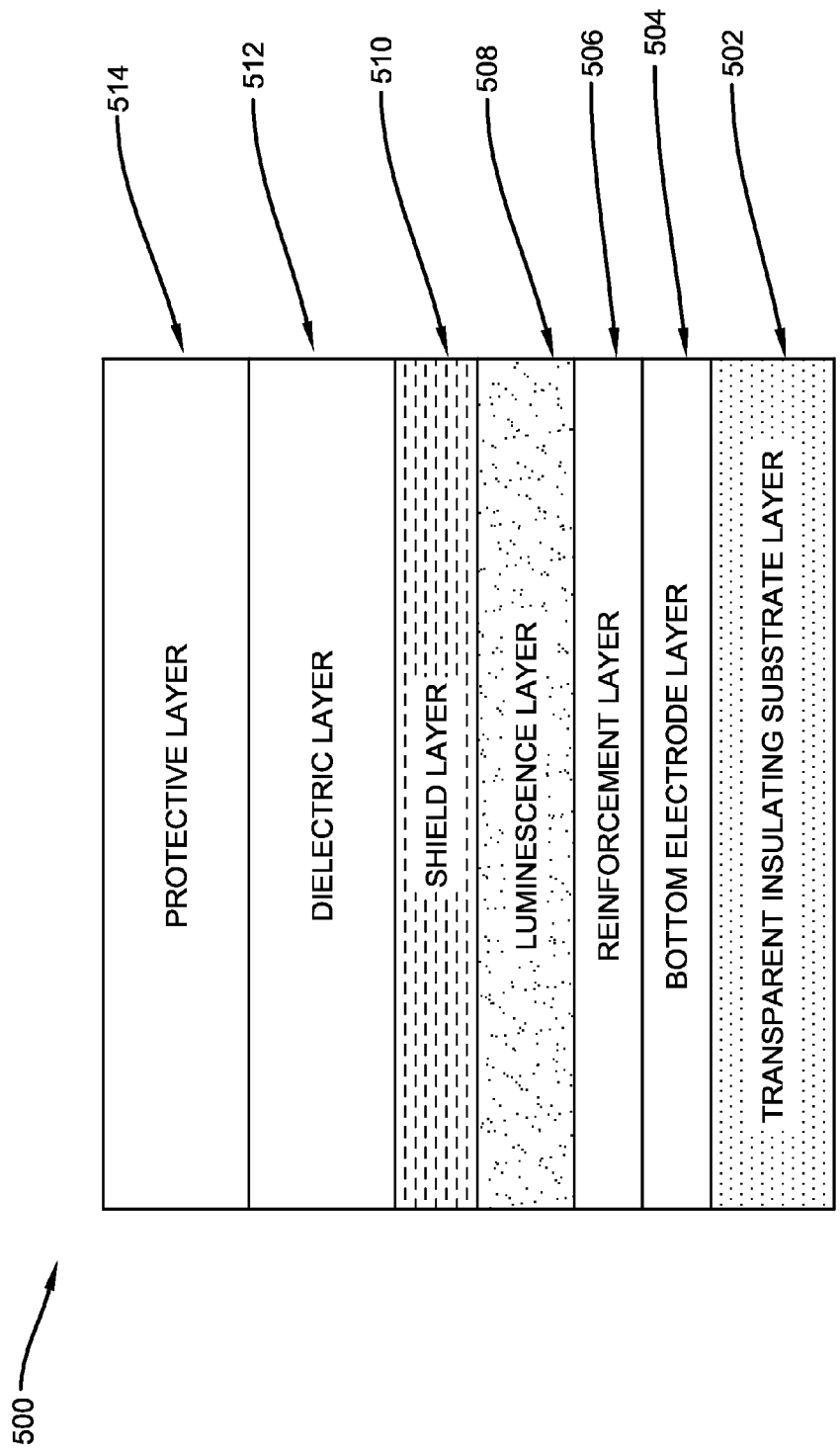
FIG. 5 is a component diagram illustrating an example implementation of one or more portions of one or more systems described herein.

FIG. 5 illustrates a component diagram of an example implementation of one or more portions of one or more systems described herein. As an example, an electroluminescent film component 500 may comprise one or more layers, and may be used to generate photons at a location of a biometric object's touch to the surface of the component 500. In the example implementation of FIG. 5, the electroluminescent film component 500 can comprise a transparent, insulating substrate layer 502. As an example, the substrate layer 502 may comprise any suitable material (e.g., glass, polymer, polyester, etc.) configured to perform as a substrate onto which the other layers may be formed, and which comprise an optically transparent material.

Further, the electroluminescent film component 500 can comprise a bottom electrode 504, comprising any suitable, transparent conducting film (e.g., 408, 412 of FIG. 4). Additionally, a reinforcement layer may 506 may be disposed on top of the bottom electrode layer 504. As an example, the reinforcement layer may be comprised of any suitable material that can be configured to provide some rigidity and reinforcement between a luminescence layer 508 and the bottom electrode 504. The luminescence layer 508 (e.g., 102 of FIGS. 1-3) can be configured to convert an electrical charge into photons indicative of a location and strength of the electrical field, as described above. That is, for example, a user's finger may provide and electrical charge to the luminescence layer 508, which can convert luminescent particles in the layer 508 in to activated particles, thereby releasing one or more photons in response to the electrical charge.

As illustrated in FIG. 5, the example, electroluminescent component 500 can comprise a shield layer 510, disposed on top of the luminescence layer 508. The shield layer 510 may be comprised of any suitable material that can be configured to mitigate emission of photons from the top surface of the luminescence layer, for example, by providing a light blocking ability; and may be appropriately deposited, and remain resident, on the luminescence layer 508. In this way, for example, photons released by the luminescent layer 508 can merely be directed toward the bottom of the electroluminescent component 500 (e.g., toward an image sensor). A dielectric layer 512 can be disposed on top of the shield layer 510, and may be configured to provide insulation and pass electrical current when appropriate, as described above (e.g., 212 of FIG. 2B). Further, a protective layer 514 may be deposited on top of the dielectric layer 512. The protective layer can be configured to mitigate physical damage to the surface of the electroluminescent component 500 and provide protection from liquids.

As an illustrative example, the exemplary electroluminescent component 500 may comprise a contact light emitting device, made up of one or more of the example layers 502-514. In this example, when an electric field is formed between an object to be imaged, such as a biometric object (e.g., one or more fingers or a hand) and the bottom electrode layer 504, the luminescence layer 508 can emit photons indicative of an image of at least a portion of the biometric object.

Figure 6:
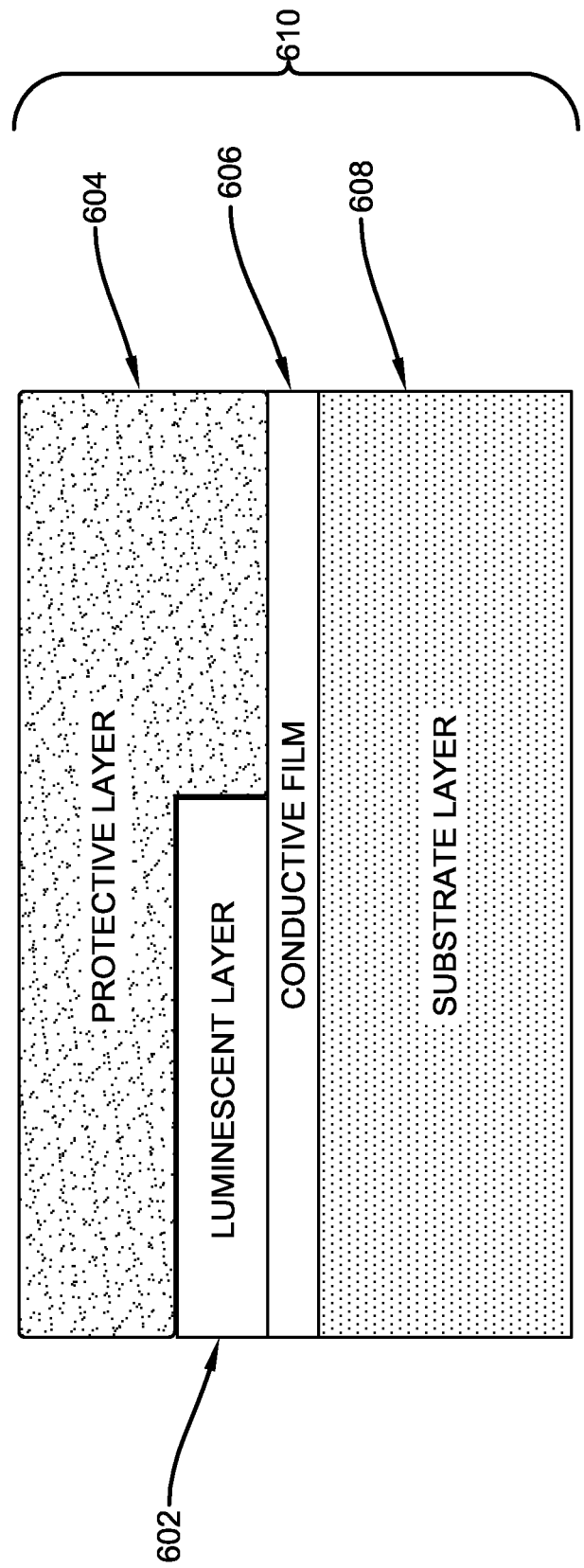
FIG. 6 is a component diagram illustrating an example implementation of one or more portions of one or more systems described herein.

FIG. 6 is a component diagram illustrating an example implementation of one or more portions of one or more systems described herein. In FIG. 6, an exemplary luminescent layer 602 (e.g., 102 of FIGS. 1, 2A and 2B; or layers 508-512 of FIG. 5) may disposed on a first conductive film layer 606 (e.g., 408 of FIG. 4) of a cover glass (e.g., 402 of FIG. 4). Further, in this illustrative example, the first conductive film layer 606 may be disposed on top of a substrate layer 608 (e.g., 410 of FIG. 4) of the cover glass used for a touch-enabled device output screen (e.g., 400 of FIG. 4). Additionally, a protective coating layer 604 (e.g., 404 of FIG. 4) may be disposed over the luminescent layer 602 and a portion of the first conductive film layer 606. In one implementation, the combination 610 of the layers 602-608 may comprise, at least a portion of, a cover glass for an exemplary, touch-enabled device screen.

As an illustrative example, FIG. 7A is a component diagram illustrating an example implementation of one or more portions of one or more systems described herein. In this implementation, the luminescent layer 602 is deposited on top of a portion of the cover glass 710 of a touch enabled device. Further, the protective layer 604 may be deposited on top of the luminescent layer 602 and the cover glass layer(s) 710. In this way, for example, the luminescent layer 602 may be effectively disposed on a desired portion of the cover glass 710, and the entire cover glass 710 can be covered by the protective layer 604. Therefore, for example, when the portion of the cover glass 710 on which the luminescent layer 602 is disposed, is contacted by a biometric object, light indicative of an image of the biometric object may be directed toward the cover glass 710 from the luminescent layer 602.

In one implementation, an image sensing component 704 may be disposed beneath the cover glass 710, positioned at the location of the luminescent layer 602, for example, such that light emitted from the luminescent layer may impact the image sensing component 704. For example, the image sensing component may comprise any suitable component (e.g., 104 in FIGS. 1, 3A and 3B), as described above. In one implementation, the image sensing component 704 may utilize an optic 702 (e.g., lens), for example, which may be configured to focus the photons emitted from the luminescent layer 602 to a desired configuration. As an example, the image sensing component 704 may yield more desirable results (e.g., improved image quality, such as focus, granularity, contrast, etc.) when the emitted light is focused into an appropriate arrangement prior to impacting the sensing component 704 surface.

Figure 7B:
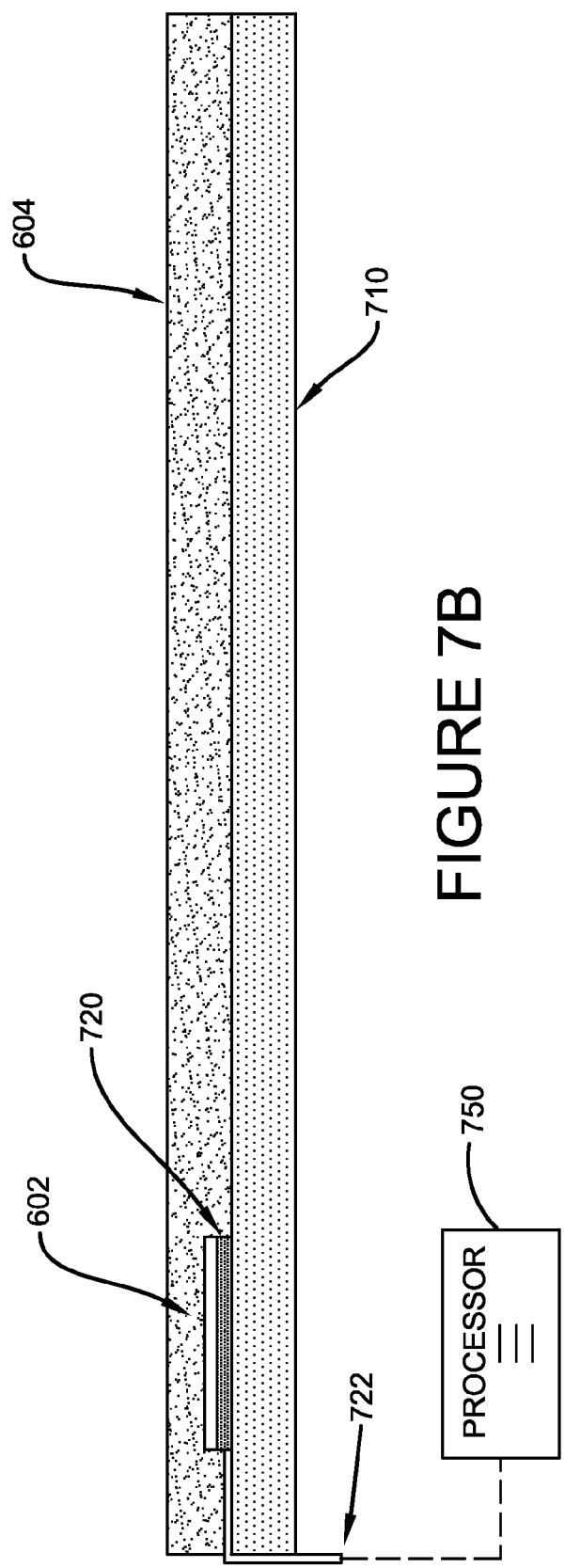

As another illustrative example, FIG. 7B is a component diagram illustrating an example implementation of one or more portions of one or more systems described herein. In this implementation, the luminescent layer 602 can be deposited on top of an image sensing component layer 720, such as the image capture component 104 of FIGS. 1, 3A and 3B. In one implementation, the luminescent layer may be disposed on a thin-film transistor (e.g., FIGS. 3A and 3B), or similar thin-film image sensor; and the combination luminescent layer 602 and thin-film image sensor 720 can be deposited on the portion of the cover glass 710 of a touch enabled device. Further, in this implementation, the thin-film image sensor 720 may be communicatively coupled, for example, using a data communication connection 722, to a processing component (e.g., computer processor) resident in, or coupled to, the touch enabled device. In this way, for example, the data representative of an image of a biometric object may be transmitted to a data and/or image processor for desired processing (e.g., comparison, enrollment, storage, etc.).

In the implementation of FIG. 7B, the protective layer 604 may be deposited on top of the luminescent layer 602 and the cover glass layer(s) 710. In this way, for example, the combination of the luminescent layer 602 and thin-film image sensor 720 may be effectively disposed on a desired portion of the cover glass 710, and the entire cover glass 710 can be covered by the protective layer 604. Therefore, for example, when the portion of the cover glass 710 on which the combination of the luminescent layer 602 and thin-film image sensor 720 is disposed is contacted by the biometric object, light indicative of an image of the biometric object may be directed from the luminescent layer 602 to thin-film image sensor 720, where the light may be converted into electrical signals indicative of data representing an image of at least a portion of the biometric object.

As an illustrative example, FIGS. 8A, 8B, 8C, 8D are component diagrams illustrating example implementations of one or more portions of one or more systems described herein. With continued reference to FIGS. 6 and 7, FIGS. 8A-8D illustrate example implementations of devices 800, 810, 820, 830 that may utilize touch enabled surfaces for receiving user input. For example, smart devices, tablets, monitors, laptops and other displays may utilize a cover glass and other systems that allow the user to interact with the device by touching the screen. In these implementations, the respective devices 800, 810, 820, 830 can comprise a type of home button 802, 812, 822, 832 (e.g., or area).

For example, smart devices and tablet typically comprise a home button that may activate the device, place it to a home condition, or perform other actions. In one implementation, the luminescent layer 602 (e.g., or combined luminescent layer 602 and thin-film image sensor 720) may be disposed at the location of the home button or area 802, 812, 822, 832, beneath the protective layer 604, and on top of the cover glass 710 (e.g., sandwiched between the protective layer and cover glass). Further, in one implementation, the image sensing component 704 may be disposed beneath the home button or area 802, 812, 822, 832, and can be configured to receive the light emitted by the luminescent layer 602, for example, when contacted by a biometric object.

In one implementation, the data generated by the image sensing component 704, or thin-film image sensor 720 (e.g., data in the form of electrical signals generated by the impact of photons on the image sensor), may be used to generate an image of the object that contacted the device surface at the location of the home button or area 802, 812, 822, 832. For example, the touch object may comprise a biometric object (e.g., fingerprint), and the biometric image may be used for identification association of the user (e.g., for security, etc.). In another implementation, the data generated by the image sensing component 704, or thin-film image sensor 720 may be used as an input event. For example, upon touching the device surface at the location of the home button or area 802, 812, 822, 832, the generated data may indicate that the user has selected (e.g., operated) the function associated with the touch location (e.g., home button). That is, for example, instead of mechanical button, the data generated by the touch can indicate selection or pressing the home button. In another implementation, the biometric image data generated by the image sensor may be compared against stored (e.g., locally and/or remotely) biometric data for the user, and if threshold criteria are met by the comparison, the function associated with the touch location can be initiated; otherwise no action may be initiated.

FIGS. 9A, 9B and 9C are diagrams illustrating example environments where one or more portions of one or more systems described herein may be implemented. With continued reference to FIGS. 6-8, in one implementation, as illustrated in FIG. 9A, an exemplary device may comprise a portable computing device 900, such as a laptop computer. In this example, the combination luminescent layer 602, cover glass 710, and image sensing component 704 may be disposed at a location used for input actions 910, of the monitor 902. In another implementation, as illustrated in FIG. 9B, the exemplary device may comprise another portable computing device 908, such as a smart device, tablet, mobile telephone, smart display, portable console, etc. In this example, the combination luminescent layer 602, cover glass 710, and image sensing component 704 may be disposed at a location used for input actions 913, of the display screen 912. In another implementation, as illustrated in FIG. 9C, the exemplary device may comprise another portable computing device 920, such as a smart device, tablet, mobile telephone, smart display, portable console, etc. In this example, the combination luminescent layer 602, cover glass 710, and image sensing component 704 may be disposed at a location used for input actions 916, 914, of the display screen 922.

In this way, for example, when a user of the device 800, 810, 820, 830 touches (e.g., with their finger) the home button area 802, 812, 822, 832 an electric field can exist across the luminescent layer 602, which may result in photons indicative of the touch (e.g., fingerprints) being emitted toward the image sensing component 704, through the cover glass 710 (e.g., and the optic 702). Further, in this example, the image sensing component 704 may be configured to convert the received photons into electrical signals, as described above, indicative of the image of the touch. Additionally, the electrical signals may comprise data representative of an image of the object that contacted the surface of the home button area 802, 812, 822, 832.

With reference to FIGS. 8A-8D, and 9A-9C, in one implementation, the luminescent layer 602 and image sensing component 704 (e.g., or combination luminescent layer 602 and thin-film image sensor 720) can be positioned in/on the device at a location where the touch-enabled screen feature of the device may not be active, such as at a perimeter, top or bottom location of the device cover (e.g., 802, 812, 822 of FIGS. 8A-8C), for example, outside of the display area. In another implementation, the luminescent layer 602 and image sensing component 704 (e.g., or combination luminescent layer 602 and thin-film image sensor 720) can be positioned in/on the device at a location within the boundaries of the touch-enabled screen area, such as within the display screen area (e.g., 908, 913, 916 of FIGS. 9A-9C). It will be appreciated that the location/position of the systems described herein is not limited to any particular location in/on the device, and it is anticipated that those skilled in the art may device alternate locations, for example, on the back or sides of the device.

In one implementation, the data representing and image of the touch object (e.g., fingerprint) may be stored locally on the device and/or remotely on a remote (e.g., cloud-based) server. Further, the stored data may be used for security and/or identification purposes, such as to enable access to the device or portions of the device services by merely an authorized user. Additionally, the image data may be used to enroll individuals into a database and/or identify individuals, for example, used by security personnel.

In one aspect, a method may be devised for manufacturing a biometric sensor system, such as a system that can provide an integrated biometric imager to a touch enabled computing device and/or information appliance, such as a computer, laptop computer, smart device, mobile telephone, tablet device, or some other information appliance that can receive input by touching and/or interacting with a touch sensitive surface. As an example, a method may be devised to construct a system such as those described above, in FIGS. 1-9.

Figure 10:
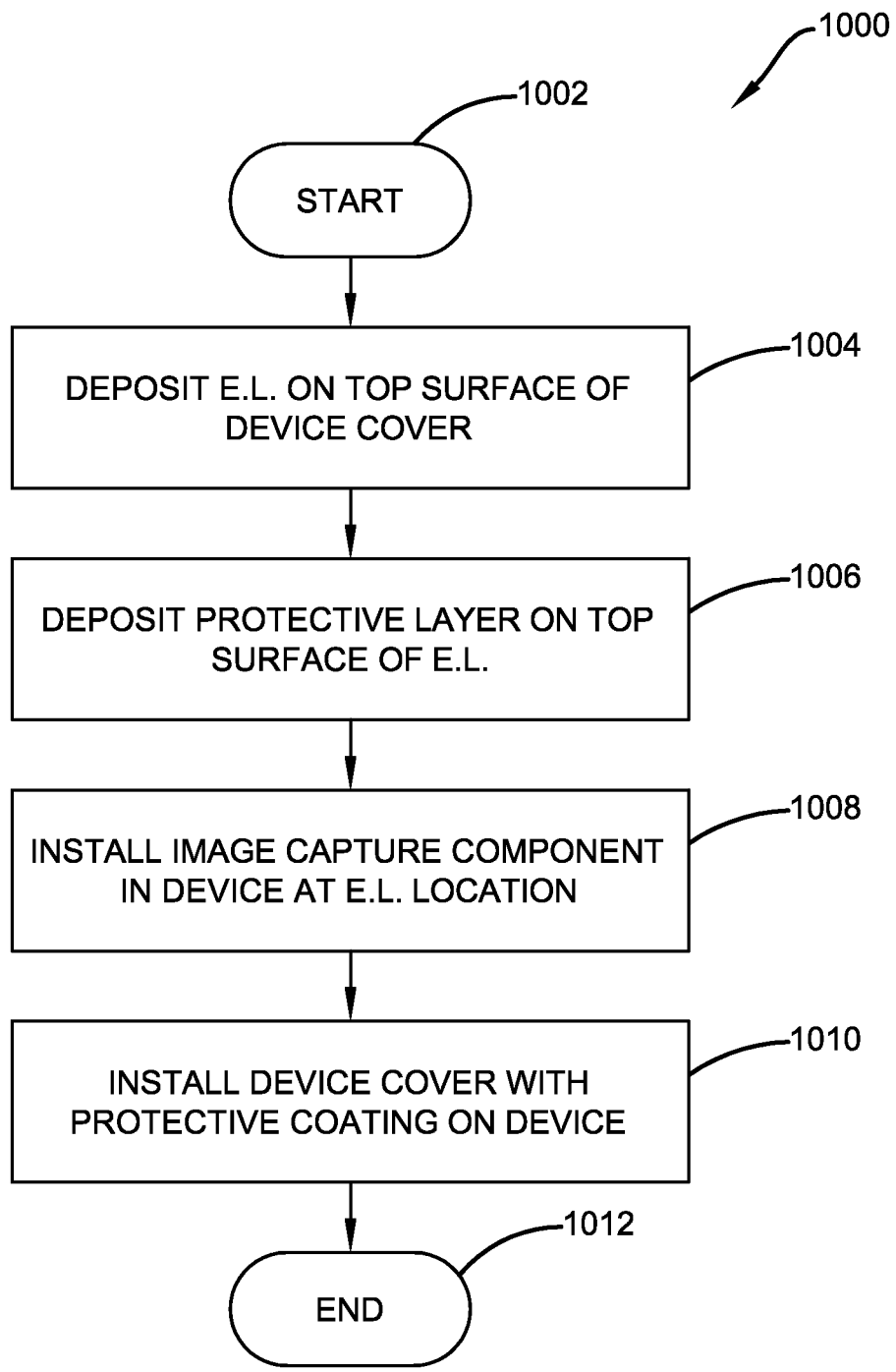
FIG. 10 is a flow diagram illustrating an exemplary method for manufacturing a biometric sensor system.

FIG. 10 is a flow diagram illustrating an exemplary method 1000 for manufacturing a biometric sensor system. The exemplary method 1000 begins at 1002. At 1004, an electroluminescent layer may be deposited on a top surface of a device cover glass or cover material, at a desired location. As an example, deposition of the electroluminescent layer may be performed using one or more screen printing techniques (e.g., as in printed circuit board (PCB) screen printing), chemical vapor deposition (CVD), a chemical solvent deposition technique, atomic layer deposition (ALD), sputtering, or any appropriate thin-film deposition technique. Further, in one implementation, the electroluminescent layer may be merely deposited at a desired location, such as at a home button area, or an area where biometric sensing may be desired for the target device, or over an entire portion of the cover glass.

At 1006 of the exemplary method 1000, a protective layer may be deposited on the top surface of the electroluminescent layer. Further, the protective layer may be deposited over the remaining portions of the device cover glass not covered by the electroluminescent layer. As described herein, the protective layer may comprise any suitable material configured to provide protection to the top surface of the cover screen and electroluminescent layer, for example, protecting against physical, chemical, light and liquid intrusion and/or damage.

At 1008, the image sensing component may be installed in the target device (e.g., touch enabled device), such as at a location where the electroluminescent layer may be positioned when the cover glass is installed on the device. For example, the image sensing component can be installed inside the cover of the device, below the location where the electroluminescent layer may be installed, such that light emitted by the electroluminescent layer may be directed toward the image sensing component. Additionally, in one implementation, an optic component (e.g., optical lens) can be installed, co-located with the image sensing component, for example, between the image sensor and the location of the electroluminescent component.

At 1010 of the exemplary method 1000, the cover glass, comprising the electroluminescent layer and protective cover layer can be installed on the device. As an example, the cover glass can be installed in a manner that appropriately aligns the electroluminescent layer with the image sensing component so that light emitted by the electroluminescent component may impact on the surface of the image sensing component (e.g., or the optical lens). Having installed the cover glass on the target device, the exemplary method 1000 ends at 1012.

In an alternate implementation of a method for manufacturing a biometric sensor, the electroluminescent layer (e.g., or a piezoelectric luminescent layer) may be deposited over a thin-film image sensor (e.g., a TFT 104 of FIGS. 3A and 3B). For example, instead of depositing the electroluminescent layer directly onto the device cover (e.g., as in 1004 of FIGURED 10), the electroluminescent layer may be deposited onto a thin-film image sensor. Further, the combination electroluminescent layer and thin-film sensor may be deposited on the top surface of the device cover (e.g., as in 1004 of FIGURED 10).

In this implementation, the protective layer can be deposited on top of the electroluminescent layer and top surface of the device cover (e.g., cover glass) (e.g., as in 1006 of FIG. 10). Further, the thin-film image sensor may be communicatively coupled with a processor (e.g., via a communication line, such as a data bus, or wireless communication) associated with the touch-enabled device. Additionally, in one implementation, because the thin-film image sensor may be used to capture data indicative of an image of at least a portion of the biometric object, an image capture component may not be installed in the device at the electroluminescent location, as in 1008 of FIG. 10. In this implementation, the device cover, comprising the combination electroluminescent layer and thin film image sensor, and protective layer, may be installed on the target, touch-enabled device (e.g., as in 1010 of FIG. 10).

Figure 11:
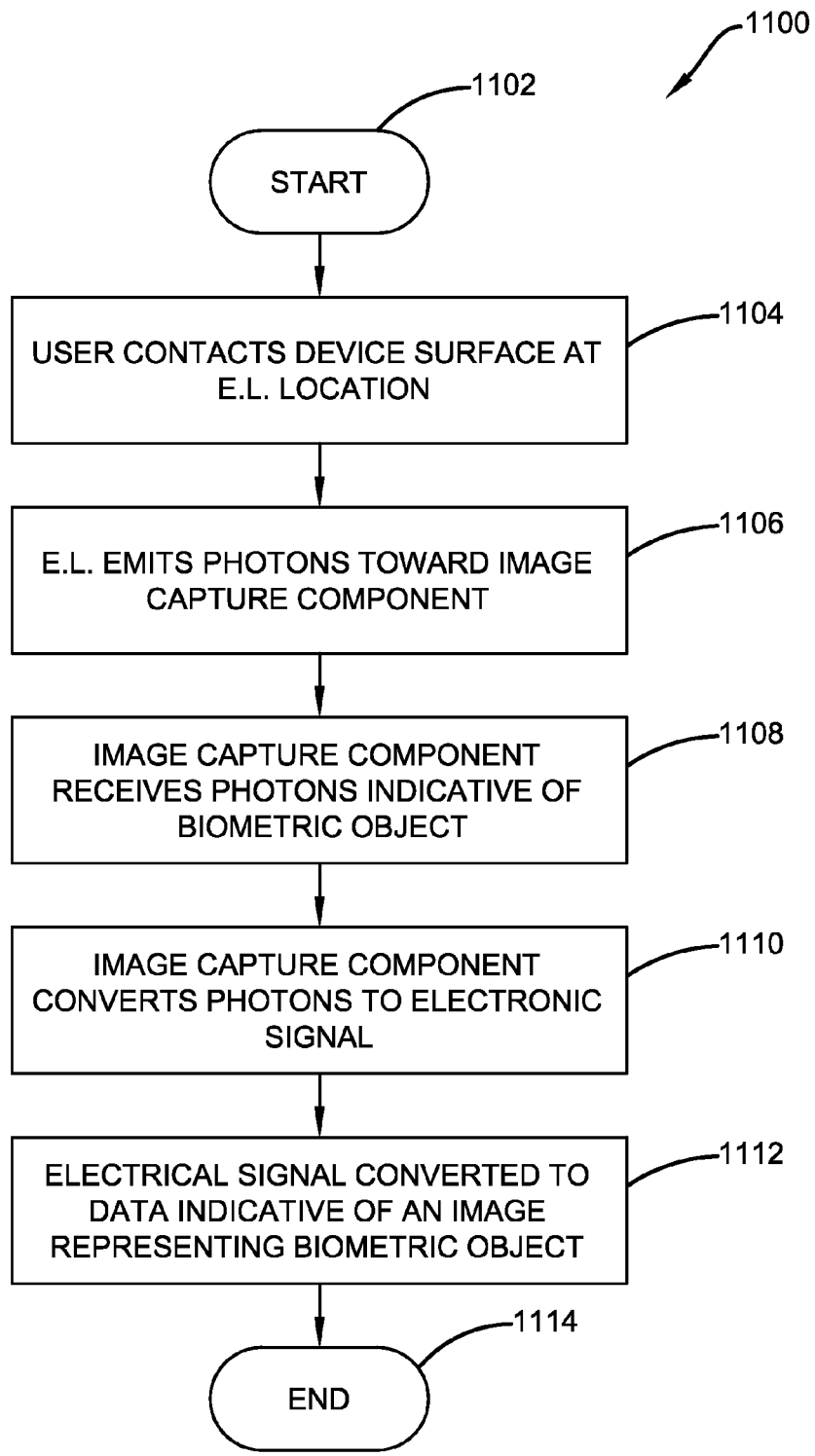
FIG. 11 is a flow diagram illustrating an exemplary method for using a biometric sensor.

FIG. 11 is a flow diagram illustrating an exemplary method 1100 for using a biometric sensor system. The exemplary method 1100 begins at 1102. At 1104, a user of a touch-enabled device may contact the surface of the electroluminescent layer location on the device surface (e.g., 802, 812, 822, 832 in FIGS. 8A-8D; 910, 913, 914, 916 of FIGS. 9A-9C). As an example, the user may contact the surface using a finger, two or more fingers, or their hand. At 1106, the electroluminescent layer may emit photons toward an image capture component. For example, as described above, the electroluminescent layer may covert an electrical charge (e.g., or pressure), provided by the touch object, into photons indicative of the touch object.

Further, as in one implementation, the image capture component may be disposed in the device, below the cover glass of the device, for example, as an APS, TFT, CMOS, CCD, CIS, or some other light sensor that can convert photons into an electrical signal. In another implementation, the image capture component may be disposed beneath the electroluminescent layer as a thin film sensor (e.g., TFT or the like), which can be disposed on top of the cover glass.

At 1108 of the exemplary method 1100, the image capture component can receive the photons indicative of the biometric object. That is, for example, the photons emitted by the electroluminescent layer may impact light sensitive portions of the image sensor component, where the photons are indicative of an image of the object that contacted the device cover at the electroluminescent layer location. At 1110, the image capture component can convert the photons to electrical signals, as described above. At 1112, the electrical signals can be converted to data indicative of an image representing at least a portion of the biometric object. That is, for example, the electrical signals can be indicative of a number and location of photons that impacted the image sensing component. In this example, the number and location of photons indicated by the electrical signals can be converted to image data representing an image of the object that contacted the surface (e.g., fingerprint(s) or handprint(s)).

Having converted the electrical signals to data indicative of an image of the biometric object, the exemplary method 1100 ends at 1114.

Figure 12:
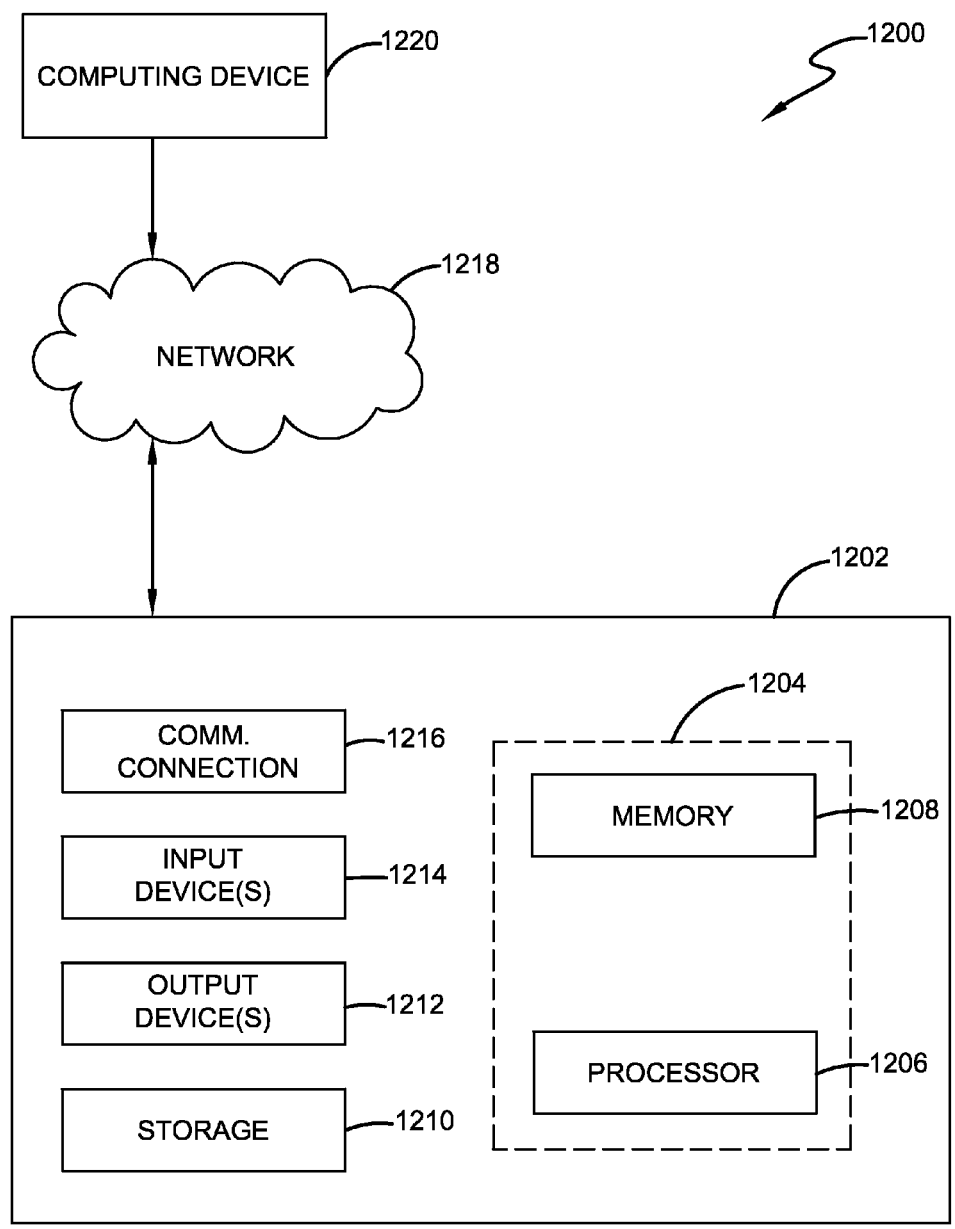
FIG. 12 illustrates an exemplary computing environment wherein one or more of the provisions set forth herein may be implemented.

In another implementation, one or more of the systems and techniques, described herein, may be implemented by a computer-based system. An example computer-based system environment is illustrated in FIG. 12. The following discussion of FIG. 12 provides a brief, general description of a computing environment in/on which one or more or the implementations of one or more of the methods and/or system set forth herein may be implemented. The operating environment of FIG. 12 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 12 illustrates an example of a system 1200 comprising a computing device 1202 configured to implement one or more implementations provided herein. In one configuration, computing device 1202 includes at least one processing unit 1206 and memory 1208. Depending on the exact configuration and type of computing device, memory 1208 may be volatile (such as RAM, for example), non-volatile (such as ROM, flash memory, etc., for example) or some combination of the two. This configuration is illustrated in FIG. 12 by dashed line 1204.

In other implementations, device 1202 may include additional features and/or functionality. For example, device 1202 may also include additional storage (e.g., removable and/or non-removable) including, but not limited to, magnetic storage, optical storage, and the like. Such additional storage is illustrated in FIG. 12 by storage 1210. In one implementation, computer readable instructions to implement one or more implementations provided herein may be in storage 1210. Storage 1210 may also store other computer readable instructions to implement an operating system, an application program and the like. Computer readable instructions may be loaded in memory 1208 for execution by processing unit 1206, for example.

The term "computer readable media" as used herein includes computer storage media. Computer storage media includes volatile and nonvolatile, removable and non-removable media implemented in any method or technology for storage of information such as computer readable instructions or other data. Memory 1208 and storage 1210 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1202. Any such computer storage media may be part of device 1202.

Device 1202 may also include communication connection(s) 1216 that allows device 1202 to communicate with other devices. Communication connection(s) 1216 may include, but is not limited to, a modem, a Network Interface Card (NIC), an integrated network interface, a radio frequency transmitter/receiver, an infrared port, a USB connection or other interfaces for connecting computing device 1202 to other computing devices. Communication connection(s) 1216 may include a wired connection (e.g., data bus) or a wireless connection (e.g., wireless data transmission). Communication connection(s) 1216 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1202 may include input device(s) 1204 such as keyboard, mouse, pen, voice input device, touch input device, infrared cameras, video input devices, and/or any other input device. Output device(s) 1212 such as one or more displays, speakers, printers, and/or any other output device may also be included in device 1202. Input device(s) 1214 and output device(s) 1212 may be connected to device 1202 via a wired connection, wireless connection, or any combination thereof. In one implementation, an input device or an output device from another computing device may be used as input device(s) 1214 or output device(s) 1212 for computing device 1202.

Components of computing device 1202 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another implementation, components of computing device 1202 may be interconnected by a network. For example, memory 1208 may be comprised of multiple physical memory units located in different physical locations interconnected by a network.

Those skilled in the art will realize that storage devices utilized to store computer readable instructions may be distributed across a network. For example, a computing device 1220 accessible via network 1218 may store computer readable instructions to implement one or more implementations provided herein. Computing device 1202 may access computing device 1220 and download a part or all of the computer readable instructions for execution. Alternatively, computing device 1202 may download pieces of the computer readable instructions, as needed, or some instructions may be executed at computing device 1202 and some at computing device 1220.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Reference throughout this specification to "one implementation" or "an implementation" means that a particular feature, structure, or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

What is claimed is:

1. A biometric sensor system, comprising:
   a luminescent layer disposed over a portion of a touch screen layer of a touch enabled device, the luminescent layer configured to emit photons toward the touch screen layer upon contact from a biometric object; and
   an image capture component disposed beneath the luminescent layer at the portion of the touch screen layer, the image capture component configured to convert at least a portion of the photons emitted into data indicative of an image comprising a representation of at least a portion of the biometric object.

2. The system of claim 1, luminescent layer comprising an electroluminescent layer configured to emit the photons in response to an electrical charge received from the biometric object.

3. The system of claim 2 the luminescent layer comprising a dielectric layer disposed above the electroluminescent layer.

4. The system of claim 2, the luminescent layer comprising a shielding layer, disposed above the electroluminescent layer, and configured to mitigate emission of photons from a top surface of the luminescent layer.

5. The system of claim 1, comprising a protective layer disposed over the luminescent layer.

6. The system of claim 1, the touch screen layer comprising a transparent electrode layer disposed over a substrate layer.

7. The system of claim 1, the image capture component disposed between the luminescent layer and the touch screen layer, and comprising a thin film image sensor.

8. The system of claim 7, the image capture component communicatively coupled with one or more of:
   an image processor configured to generate an image representing the biometric object from the data indicative of the image; and
   a data processor configured to use the data indicative of the image to initiate a function on the device.

9. The system of claim 8, the communicative coupling comprising one of:
   a wireless data transmission coupling; and
   a wired data bus coupling.

10. The system of claim 1, the image capture component disposed below the touch screen layer, and the touch screen layer disposed between the luminescent layer and the image capture component.

11. The system of claim 10, the image capture component comprising an optic configured to direct at least a portion of the photons to an image sensor configured to capture the image comprising a representation of at least a portion of the biometric object.

12. A method of manufacture of a biometric sensor system, comprising:
   depositing an luminescent layer over at least a portion of a touch screen layer that is configured to be installed in a touch enabled device, the luminescent layer configured to emit light toward the touch screen layer upon contact from a biometric object, at least a portion of the emitted light received by an image sensor disposed at the portion of the touch screen layer, the image sensor configured to convert at least a portion of the light emitted into data indicative of an image comprising a representation of at least a portion of the biometric object.

13. The method of claim 12, depositing the luminescent layer over the portion of the touch screen layer comprising:
   operably coupling a thin-film image sensor beneath the bottom surface of the luminescent layer, the thin-film image sensor comprising the image sensor configured to convert at least a portion of the light emitted into data indicative of the image comprising the representation of at least a portion of the biometric object; and
   depositing the combination of the luminescent layer and thin-film image sensor over the portion of the touch screen layer.

14. The method of claim 12, comprising installing the image sensor in the touch enabled device beneath the portion of a touch screen layer.

15. The method of claim 14, comprising installing an optic at the image sensor, the optic configured to focus the emitted light in a desired configuration for use by the image sensor.

16. The method of claim 12, depositing the luminescent layer comprising depositing an electroluminescent layer configured to emit the photons in response to an electrical charge received from the biometric object, the luminescent layer comprising one or more of:
   a dielectric layer disposed above the electroluminescent layer;
   a shielding layer, disposed on above the electroluminescent layer, and configured to mitigate emission of photons from a top surface of the luminescent layer; and
   a protective layer disposed over the luminescent layer.

17. A method of using a biometric sensor, comprising:
   emitting light from an luminescent layer toward a touch screen layer, disposed on a touch enabled device, upon contact of a biometric object on the luminescent layer disposed on top of a portion of the touch screen layer; and
   converting at least a portion of the emitted light into data indicative of an image, comprising a representation of at least a portion of the biometric object, using an image sensor disposed at the portion of the touch screen layer.

18. The method of claim 17, comprising generating the image of the biometric object using an image processor.

19. The method of claim 17, comprising initiating a function on the device in response to a processor receiving the data indicative of the image.

20. The method of claim 17, emitting light from the luminescent layer toward the touch screen layer comprising emitting the photons in response to an electrical charge received from the biometric object contacting the surface of the device.

* * * * *